United States Patent [19]

Seebinger

[11] 4,449,020

[45] May 15, 1984

[54] MULTI-POSITION MICROPHONE STAND SUPPORT ASSEMBLY

[75] Inventor: Frederick L. Seebinger, Smoke Rise, N.J.

[73] Assignee: Atlas Sound Division of American Trading & Production Corporation, Parsippany, N.J.

[21] Appl. No.: 295,907

[22] Filed: Aug. 24, 1981

[51] Int. Cl.³ .................... H04R 1/02; F16M 11/00
[52] U.S. Cl. ........................ 179/147; 179/146 R; 179/148 R; 179/149; 179/178; 248/122; 381/118
[58] Field of Search ............ 179/147, 148 R, 148 F, 179/150, 151, 146 R, 121 R, 178, 149; 381/118; 248/122, 124

[56] References Cited

U.S. PATENT DOCUMENTS

| 2,532,173 | 11/1950 | Lewis | 179/148 R |
| 2,916,562 | 12/1959 | Kuehn | 179/111 R |
| 3,079,473 | 2/1963 | Hoven et al. | 179/149 |
| 3,526,718 | 9/1970 | Beatty | 179/148 R |
| 3,776,649 | 12/1973 | Kemezys | 403/90 |
| 4,222,680 | 9/1980 | Browning | 403/90 X |

FOREIGN PATENT DOCUMENTS 141155  5/1951  Australia .................. 179/149

Primary Examiner—A. D. Pellinen
Assistant Examiner—Danita R. Byrd
Attorney, Agent, or Firm—Blum, Kaplan, Friedman, Silberman & Beran

[57] ABSTRACT

A microphone stand assembly incorporating an adjustable pivot for allowing a microphone support column to be securely oriented in at least two positions is provided. Interchangeable single and dual pivots accommodate either one or two microphone support columns. The dual pivot permits a performer to utilize a single microphone stand with two microphones at different heights for simultaneous voice and musical instrument amplification.

14 Claims, 8 Drawing Figures

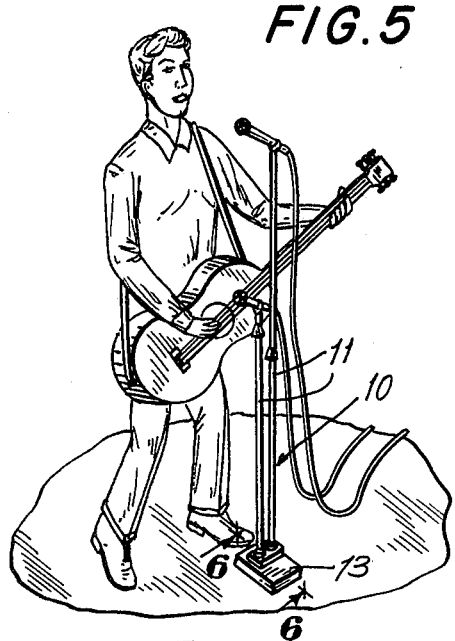
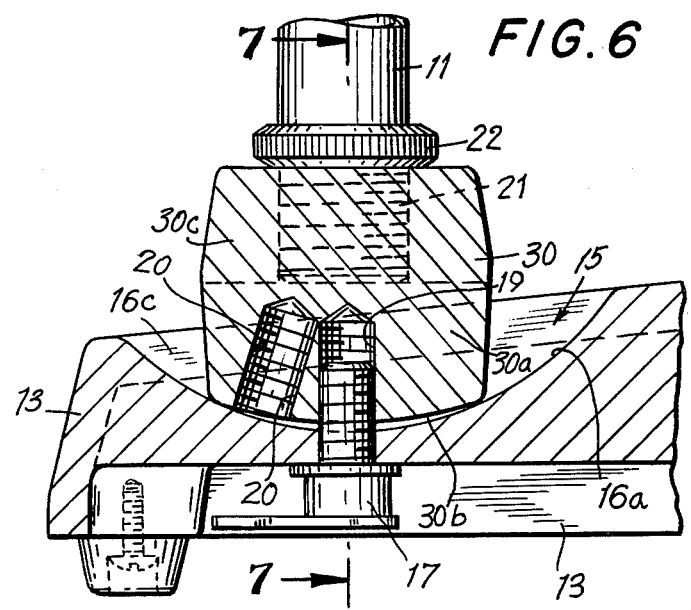
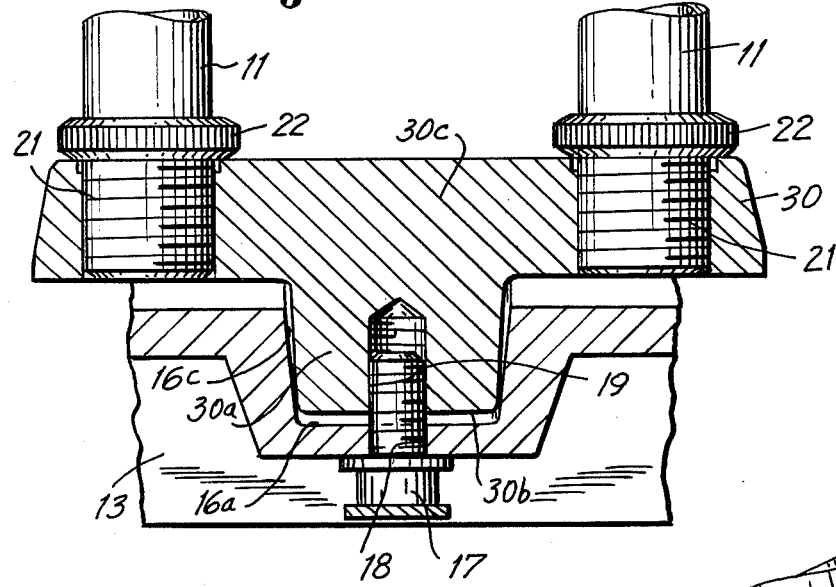
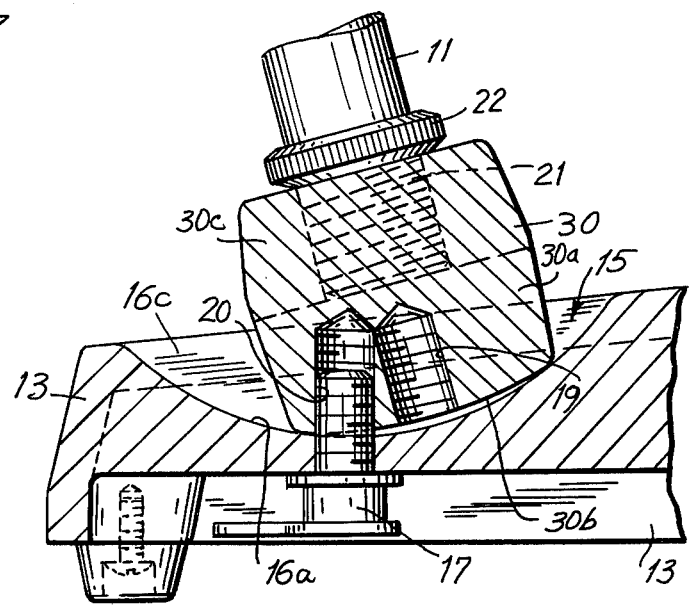

MULTI-POSITION MICROPHONE STAND SUPPORT ASSEMBLY

BACKGROUND OF THE INVENTION

This invention relates generally to a microphone stand assembly and, in particular, to a microphone stand assembly for allowing a change in the position of a microphone support column and for accommodation of more than one microphone support column. Heretofore, prior art microphone stands that admit of positioning provide pivotal movement at the position where the microphone is coupled to the microphone column or at the position where a boom member supports the microphone and is pivotally joined to the microphone column. Also, two independent microphone stands are necessary when a singer-musician, such as a guitar player, requires two microphones, a first positioned proximate to his mouth and a second positioned proximate to his guitar. Accordingly, it is desirable to provide a highly stable multi-positionable microphone stand assembly for adjustment of the microphone support column at the base thereof and that permits more than one microphone to be used with a microphone stand assembly.

SUMMARY OF THE INVENTION

Generally speaking, in accordance with the invention, a microphone stand assembly accommodating at least one microphone support column in at least two orientations is provided. The microphone stand assembly constructed and arranged in accordance with the invention is formed by a base having a track disposed therein for providing an interchangeable single or dual pivot. A locking mechanism is adapted to be secured to the pivot and to the base to thereby position the pivot and, hence, the microphone column in a predetermined position.

Accordingly, it is an object of this invention to provide an improved multi-positionable microphone stand assembly.

A further object of the instant invention is to provide an improved multi-positionable microphone stand assembly wherein the orientation of the microphone column is established at the base.

Another object of the invention is to provide an improved multi-positionable microphone stand assembly capable of supporting two microphones.

Still another object of the invention is to provide an improved highly stable multi-positionable stand assembly.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a perspective view showing a dual pivot microphone assembly constructed in accordance with a further embodiment of the instant invention;

FIG. 6 is a sectional view taken along line 6—6 of FIG. 5;

FIG. 7 a view taken generally along line 7—7 of FIG. 6 with parts shown in elevation for clarity; and FIG. 8 is a sectional view similar to FIG. 6 depicting the positioning of a microphone column in a further orientation.

DETAILED DESCRIPTION OF THE PREFERRED EMBODIMENTS

Figure 1:
FIG. 1 is a perspective view showing a microphone stand assembly constructed in accordance with a preferred embodiment of the instant invention.

Referring now to FIG. 1, a microphone stand assembly, generally indicated at 10 is illustrated. The microphone stand assembly includes a base 13 supporting microphone support column 11, which in turn supports a microphone 12.

Figure 2:
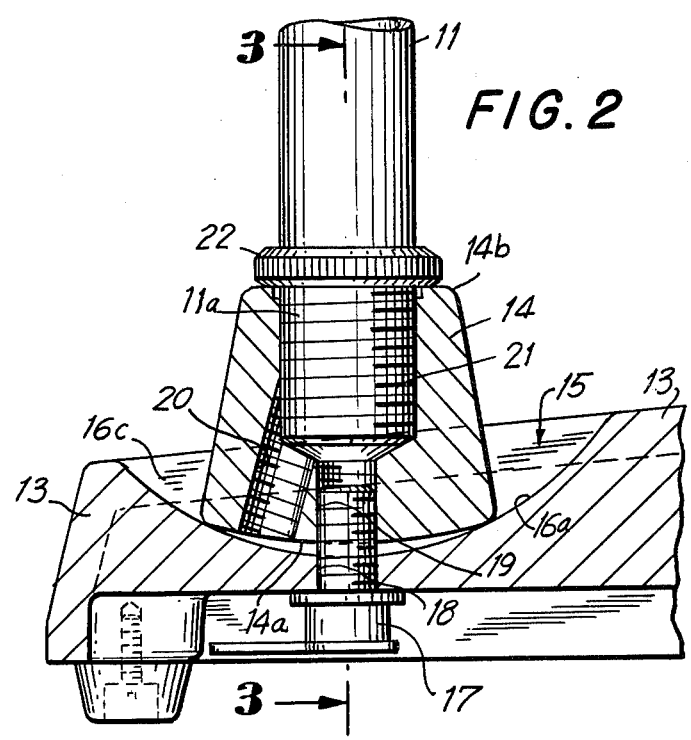
FIG. 2 is a sectional view taken along line 2—2 of FIG. 1.
Figure 3:
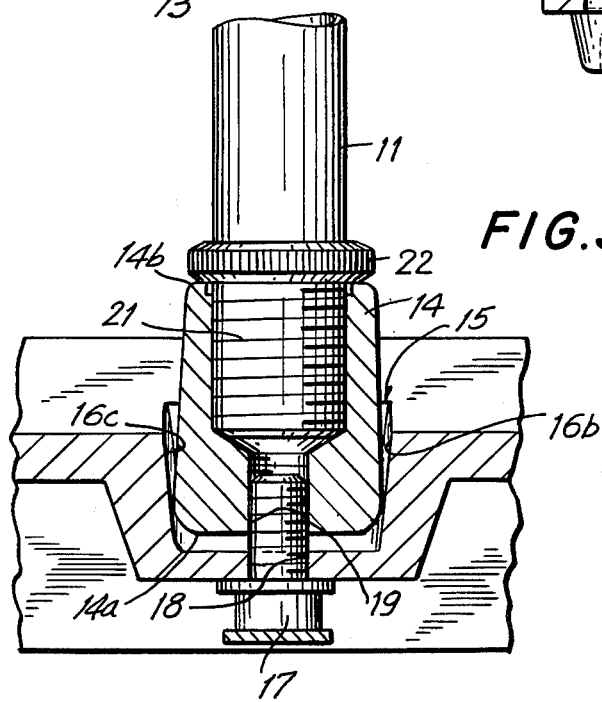
FIG. 3 a view taken generally along line 3—3 of FIG. 2 with parts shown in elevation for clarity.
Figure 4:
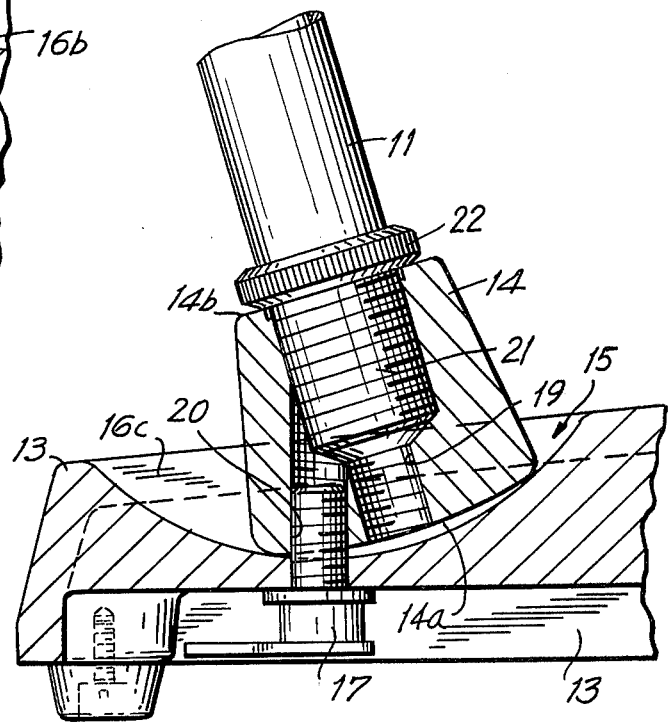
FIG. 4 is a sectional view similar to FIG. 2 depicting the positioning of a microphone column in a further orientation.

Referring specifically to FIGS. 2 and 3, base 13 is formed of cast iron and includes a track 15 formed therein. Track 15 is defined by an arcuate bottom wall 16a and is rectangularly cross-sectioned transverse to the lengthwise extent of the track to define side walls 16b and 16c. An orientation opening 18 is formed in the arcuate wall 16a of track 15.

Pivot 14 is formed of cast iron in the shape of a tapered rectangular box. Pivot 14 includes a flat top wall 14b and an arcuate bottom wall 14a that is shaped to be positioned within track 15. Contained in arcuate wall 14a is a first through hole 19 and a second through hole 20 for receiving a locking bolt 17. As is explained below, pivot 14 may be secured in various orientations in track 15 by locking bolt 17. A threaded sleeve 21 is formed in pivot 14 at the top wall 14b for receiving mirophone support column 11. The microphone support column includes a threaded end 11a which is releasably secured in the threaded sleeve 21 by a locking ring 22.

Pivot 14 is secured to base 13 by first being positioned in a desired orientation within track 15. The orientation is selected by bringing either first through hole 20 or second through hole 19 into alignment with an orientation opening 18. Locking bolt 17 is then placed through the aligned opening 18 in bottom arcuate wall 16a of track 15 and first through hole 19 or the second through hole 20 and thereafter is tightened. In the exemplary embodiments illustrated in FIGS. 2 and 3, when locking bolt 17 is tightened into the first through hole 19, the microphone support column 11 is disposed in a vertical position. When locking bolt 17 is placed in second through hole 20, the microphone suppot column 11 is at an angle to the base 13 directed toward the performer. It is apparent that the microphone column can be adjusted into any number of angular positions by increasing the number of through holes formed in the pivot and that the angle of the through holes can be selectively varied.

A further embodiment is illustrated in FIGS. 5 through 8, with like reference numerals being utilized to denote like elements described above. Pivot 30, like pivot 14, is formed of cast iron and is constructed and arranged to fit into track 15. Pivot 30 has a bottom rectangular block portion 30a having a bottom arcuate wall 30b and a top portion 30c. Top portion 30c of pivot 30 is a rectangular bar which, together with bottom portion 30a, forms a T-shaped bar which straddles either side of track 15 and accommodates two threaded sleeves 21 for supporting two microphone support columns 11. First and second blind holes 19 and 20 on arcuate wall 30b are used to select the pivot position by inserting locking bolt 17 through opening 18 on bottom arcuate wall 16a, and by tightening locking bolt 17 into either first blind hole 19 (vertical position) or second blind hold 20 (slanted position), as illustrated in the exemplary embodiments in FIGS. 7 and 8. Thus, a pivot that is capable of positioning and supporting two microphone columns on a single base is provided.

The microphone stand assembly of the instant invention is thus characterized by a single base and pivot that is capable of supporting a mirophone column in at least two positions. A further characteristic of the instant invention is the support of two microphones on a single base to permit two microphones to be simultaneously used.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A microphone stand assembly for supporting a microphone support column comprising a base, said base including therein a track means, a pivot means adapted to be positioned within said track means at at least two predetermined positions, said pivot means being constructed and arranged to support a microphone support column, and a locking means for cooperating with said track means and said pivot means for selectively positioning said pivot means to said base at one of said predetermined positions, said pivot means including at least two positioning means for permitting said locking means to be engaged with said positioning means to orient said pivot means at one of said predetermined positions.

2. A microphone stand assembly, as claimed in claim 1, wherein said track means is configured for receiving said pivot means.

3. A microphone stand assembly, as claimed in claim 2, wherein each said positioning means is an elongated opening found in said pivot.

4. A microphone stand assembly, as claimed in claim 3, wherein said track means includes one arcuate bottom wall having an orientation opening formed therein, said opening being disposed in alignment with one of said positioning means for permitting said locking means to be inserted through said orientation opening and into engagement with said positioning means to define a predetermined orientation of said microphone column.

5. A microphone stand assembly, as claimed in claim 1, 2, 3 or 4 wherein said pivot means includes at least one opening therein for receiving and securing a microphone column.

6. A microphone stand assembly, as claimed in claim 1, 2, 3 or 4, wherein said pivot means includes at least two elongated openings formed therein, said elongated openings being positioned and arranged to receive at least two mirophone columns therein.

7. A microphone stand assembly, as claimed in claims 2, 3 or 4, wherein said locking means is a locking bolt, and said locking means includes a first hole formed in said pivot means for receiving said locking bolt to define a first locked position and a second hole formed in said pivot means for receiving said locking bolt to define a second locked position.

8. A microphone stand assembly for supporting a microphone support column comprising a base means, said base means being constructed and arranged to support at least two microphone support columns, each of said microphone columns having a first threaded end, said base means cooperating with each of said microphone columns, said base means including locking means for securing at least two columns to said base means, said base means including at least two threaded openings formed therein, said locking means including a locking ring for securing said threaded end of each said microphone column in said threaded openings formed in said base means.

9. A microphone stand assembly, as claimed in claim 8, wherein said base means includes a base and a pivot, said base and said pivot being constructed and arranged to permit said pivot to be positioned at at least two different orientations.

10. A microphone stand assembly, as claimed in claim 9, wherein, said base means includes a track formed therein, said pivot being secured in said track by said locking means.

11. A stand assembly for supporting a support column in at least two positions comprising a base, said base including therein a track means, a pivot means, said track means being configured for receiving said pivot means within said track means at at least two predetermined positions, said pivot means being constructed and arranged to support a support column, and a locking means for cooperating with said track means and said pivot means for selectively positioning said pivot means to said base at one of said predetermined positions, said pivot means including at least two positioning means for permitting said locking means to be engaged with said positioning means to orient said pivot means at one of said predetermined positions.

12. A stand assembly, as claimed in claim 11, wherein each of said positioning means is an elongated opening formed in said pivot.

13. A stand assembly, as claimed in claim 11, wherein said track means includes one arcuate bottom wall having an orientation opening formed therein, said opening being disposed in alignment with one of said positioning means for permitting said locking means to be inserted through said orientation opening and into engagement with said positioning means to define a predetermined orientation of said support column.

14. A stand assembly, as claimed in claim 11 or 12, wherein said locking means includes a locking bolt and first and second through holes formed in said pivot means for receiving said locking bolt.

* * * * *